Nov. 3, 1959  W. S. FAUTECK ET AL  2,910,916
TOSS BOMBING APPARATUS

Filed Aug. 30, 1956  10 Sheets-Sheet 1

INVENTORS
WALTER S. FAUTECK
DONALD H. ROLLERT
BY HENRY S. STOVER

ATTORNEYS

INVENTORS
WALTER S. FAUTECK
DONALD H. ROLLERT
HENRY S. STOVER
BY
ATTORNEYS

Nov. 3, 1959   W. S. FAUTECK ET AL   2,910,916
TOSS BOMBING APPARATUS

Filed Aug. 30, 1956   10 Sheets-Sheet 6

INVENTORS
WALTER S. FAUTECK
BY DONALD H. ROLLERT
HENRY S. STOVER

ATTORNEYS

Nov. 3, 1959 W. S. FAUTECK ET AL 2,910,916
TOSS BOMBING APPARATUS
Filed Aug. 30, 1956 10 Sheets-Sheet 8

INVENTORS
WALTER S. FAUTECK
DONALD H. ROLLERT
BY HENRY S. STOYER

ATTORNEYS

INVENTORS
WALTER S. FAUTECK
DONALD H. ROLLERT
BY HENRY S. STOVER
ATTORNEYS

United States Patent Office 2,910,916
Patented Nov. 3, 1959

2,910,916

TOSS BOMBING APPARATUS

Walter Scott Fauteck, Wantagh, N.Y., Donald H. Rollert, Bethlehem, Pa., and Henry S. Stover, Anaheim, Calif., assignors to Mergenthaler Linotype Company, a corporation of New York Application August 30, 1956, Serial No. 607,155

13 Claims. (Cl. 89—1.5)

This invention relates to an apparatus for bombing from aircraft and more particularly to such apparatus for automatically releasing a bomb during the pull out from a diving maneuver executed by the aircraft preparatory to, and as part of, the bombing operation. A bombing action of this type is generally referred to as "toss" bombing since the release of the bomb is effected during the pull out from the diving maneuver rather than during the dive itself.

Bombing techniques generally employed in the past may be classified broadly in two categories, to wit, bombing from an aircraft in level flight and bombing from an aircraft engaged in a diving maneuver. The former technique is applied to the larger bomber type aircraft employed for strategic bombing and is generally effected from very high altitudes. The latter technique is applied to the attack type aircraft used in tactical maneuvers and for reasons of accuracy is generally effected at comparatively low altitudes or when the aircraft is in a very steep dive. If one considers a bombing attack from a diving aircraft, the procedure is to aim the aircraft at the target and release the bomb during the dive, after which the pilot would pull out of the dive. It is clear that while a straight line may be drawn between the aircraft and the target, the bomb will follow a generally parabolic path to the ground in accordance with bomb ballistics. Thus if the straight line between the aircraft and the target is the gun sight axis and this is parallel to the velocity vector of the aircraft, the bomb will strike the ground short of the target. The resulting error can be compensated for somewhat by depressing the gun sight axis below that of the velocity vector of the aircraft, but this would only lead to complications since the angle of the gun sight axis with respect to the thrust axis would have to be continuously varied during the dive. This, quite apparently, is an unsatisfactory solution. As a consequence, dive bombing is practiced generally under either of two limiting conditions which, as above noted, are that the bomb is released while the aircraft is in a very steep dive or while at a comparatively low altitude. In either case, the deviation of the parabolic path of the bomb from the straight line between the aircraft and the target is minimized and the accuracy of the bombing attack is improved. While the accuracy of bombing is improved, the danger to the pilot of the aircraft is increased since, in approaching the target, his freedom to maneuver is severely prescribed. If, on the other hand, the bomb is released, not during the dive itself, but at some point in the pull out path followed by the aircraft in concluding the dive, then the bomb is given an initial velocity, such that the bomb velocity vector is above the straight line between the diving aircraft and the target by an angle termed the angle of divergence. By controlling the point of release of the bomb, i.e. the angle of divergence, the bomb trajectory can be made to intersect the target regardless of the altitude of the aircraft at bomb release, or the target angle at which the aircraft approached the target, or the numerous other factors which have to be taken into account when engaged in bombing.

In toss bombing, the pilot dives the aircraft at the target until the sighting mechanism coincides with the target, whereupon he activates the bombing apparatus and immediately initiates a pull out maneuver during which the bomb is released. Since the particular point of bomb release in the pull out path is dependent on many factors, an automatic computing device is ordinarily provided to actuate the bomb release mechanism and thus relieve the pilot from exercising his judgment as to when the bomb should be released. The computing device, which will hereinafter sometimes be referred to as the toss bomb computer, takes into account many factors such as the angle at which the aircraft approaches the target, the altitude at which the bomb is released, the velocity of the aircraft, the type of aircraft, i.e. the weight and wing load factor thereof, the prevailing winds in the atmosphere at the target site and the bomb itself. The factors which are considered are broadly termed elements of aim. Certain of these quantities are measured and introduced into the computer by instrumentalities which are components of the bombing apparatus while certain other of the quantities are introduced into the computer by controls manually operated by the pilot. Of course, those quantities which are measured by instrumentalities of the bombing apparatus require precise measurement while those which are introduced manually are less likely to lead to serious error in the computation of the bomb release point even though they are of sufficient importance to warrant introduction in the first place.

A bombing apparatus for effecting a toss bombing operation is disclosed in United States Letters Patent Number 2,609,729. The apparatus disclosed therein is a device in which the instrumentalities provided for computing the point of release of the bomb during pullout are mechanical in nature. For example, mechanisms which are positioned in accordance with pressure measurements take the form of diaphragm actuated levers. Screw advanced blocks slideably position other elements, while precision gears position still other elements. Pin and slide bars are utilized throughout the apparatus. While the apparatus disclosed in the referred to patent has been satisfactory in use, it has been found that an improvement thereto can be made by resorting to electrical components for the fabrication of the bombing apparatus.

Accordingly, it is an object of this invention to provide a bombing apparatus of the type that releases a bomb during the pull out from a dive wherein the aircraft was aimed at the target, which apparatus will be simplified in mechanization, economical of material, immune to wear, readily calibrated and accurate in solution of the bombing equations.

In carrying out the invention there is provided a three dimensional cam rotatably set in accordance with the target angle at which the aircraft approaches the target and a follower positioned longitudinally with respect to the cam axis in accordance with the altitude and speed of the attacking aircraft. The radius of the cam at the point where the follower contacts the cam surface is proportional to a theoretical angle of divergence as computed for vacuum ballistics. Electrical means are provided which in response to the position of the follower on the cam surface supply a voltage output representative of the theoretical angle of divergence. Additional electric means are provided which supply output voltages responsive to the various elements of aim hereinabove referred to, and these are connected in a summation circuit together with the electrical means responsive to the theoretical angle of divergence to provide a corrected angle of divergence. Gyroscope controlled means also are provided in the summation circuit to supply a voltage representative of an angle which continually changes as the aircraft traverses its path of pull out from the dive, so that when such angle coincides with the corrected angle of divergence, the bomb release mechanism is actuated to release the bomb.

Features and advantages of this invention will be gained from the foregoing and the description of a preferred form of the apparatus which follows.

Figures 1, 2:
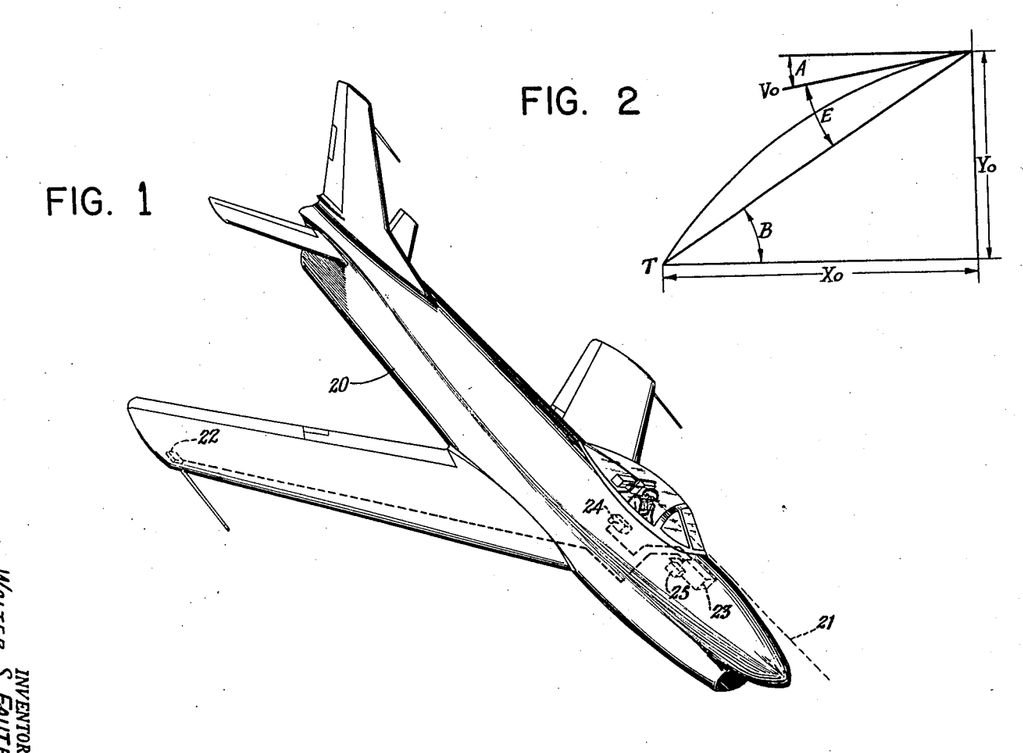
Figure 1 is a pictorial representation of an aircraft of the type for which the bombing apparatus is provided and shows one of the possible relative positions (in phantom line) of the various components of the apparatus.
Figure 2 is a diagrammatic view showing the path followed by a bomb as well as various angles which will be referred to in the specification.

Referring to Figure 1 there is shown a jet propelled aircraft 20 illustrative of the types for which the present apparatus is provided. A sighting or aiming line 21 is shown and this may be the conventional fixed gun sight ordinarily provided in this type aircraft. The various units which constitute the bombing apparatus are here shown in phantom line. Each of these units will be referred to hereinafter, hence it will suffice now simply to indicate the nature of the units. The transducer 22, located at the leading edge of a wing tip and connected to the computer 23 by means of an electric cable, is the means whereby air pressure measurements are introduced to the computer in the form of electric voltages. Similarly connected to computer 23 is the manually actuated operating box 24 which, because it is under manual control of the pilot is conveniently located in the cockpit of the aircraft. The remaining unit of the overall bombing apparatus is the gyroscope 25 and it likewise is connected to computer 23 by an electric cable. It is apparent that the unit construction here employed permits the location of the apparatus components at any point in the aircraft. Thus while operating box 24 is located convenient to the pilot, transducer 22 is located at the wing tip where it can most accurately record air pressures. In all cases, the transducer is located as near to the Pitot-static source as is possible, and in certain aircraft this is in the fuselage itself. The computer 23 may be located wherever space conditions permit. Only gyroscope 25 is restricted as to its location, and it must be mounted along the longitudinal axis of the aircraft. From the foregoing it is clear that the unitized construction of the bombing apparatus permits its use with aircraft having different operational requirements or space facilities for mounting the apparatus, and in each instance the apparatus may be used to its best advantage.

Before proceeding to a description of the individual components of the system, where such description is desirable, reference will be made to Figure 2, and the basic equation which is solved by the apparatus here provided will be developed. This will also afford the opportunity to introduce terminology which will be referred to more specifically hereinafter. It will be appreciated that the basic equation to be developed is based on vacuum ballistics and that certain corrections will have to be made thereto in order to adapt the apparatus to actual conditions encountered.

Consider a projectile whose initial velocity vector $V_0$ makes initial angle A with the horizontal. Since the horizontal component of the velocity will be $V_0 \cos A$, the horizontal distance $X_0$ that the projectile will move in time to will be $$X_0 = V_0 t_0 \cos A \qquad (1)$$

The vertical component of the initial velocity will be $V_0 \sin A$. In addition to being affected by this component, however, the vertical distance $Y_0$ moved in time to will show the effect of the acceleration $g$ of gravity. The distance moved under the acceleration of gravity will be $$\frac{gt^2}{2}$$

and the total vertical distance moved by the projectile will be $$Y_0 = V_0 t_0 \sin A + g t_0^2 \qquad (2)$$

In addition, the following equations are apparent from Fig. 2:

$$X_0 = Y_0 \cot B \qquad (3)$$
$$B = A + E \qquad (4)$$

The symbols used in the foregoing equations have the following meaning:

$X_0$ = horizontal range
$Y_0$ = height of fall
$V_0$ = initial velocity of projectile at release, i.e. linear velocity of aircraft at release
$t_0$ = time of fall of projectile
$A$ = angle of departure, i.e. the angle between initial velocity vector and horizontal $E$ = angle of divergence, i.e. the angle between initial velocity vector and the line from the aircraft of the target $B$ = angle between aircraft and horizontal during the dive, i.e. the target angle.

It can be shown, through manipulation of the above equations, that $$\sin E \frac{\cos B}{2\sqrt{2}} \pm \sqrt{Y+2+\frac{Y}{\sin B}} \pm \sqrt{Y+2-\frac{Y}{\sin B}} \quad (5)$$

where $$Y = \frac{2gY_0}{V_0^2}$$

If a value is assigned to Y and Equation 5 solved for values of B from 5° to 75°, a curve of E vs. B could be plotted, which curve would be generally disc shaped provided that polar coordinates are used. By assigning a different value to the quantity Y, a different curve would be traced. Continuing the process for differing values of Y varying one from another by $\Delta Y$, information is obtained whereby a three dimensional cam can be developed. Thus the cam, like a range table, will give the value of E according to the equation for all combinations of Y and B. To determine a particular value of E, one moves longitudinally along the cam to the point representing the quantity Y, and rotates the cam to correspond to the angle B, whereupon the radius from the axis to the surface of the cam is proportional to the value E. It is the three dimensional cam, based as it is on the quantities Y and B, that limits or controls the region of applicability of the bombing apparatus. That is, once the desired limits of altitude of bomb release $Y_0$, speed of the aircraft $V_0$ and target angle B are decided upon a cam can be fabricated to solve the problem for any combination of those quantities.

It is understood that the foregoing represents a theoretical solution to the bombing problem and that certain correction factors have to be taken into account before an actual solution is obtained. Such factors will be considered hereinafter but first, attention is directed to the mechanism for positioning the three dimensional cam and the cam follower as well as the electrical components actuated thereby.

Figure 3:
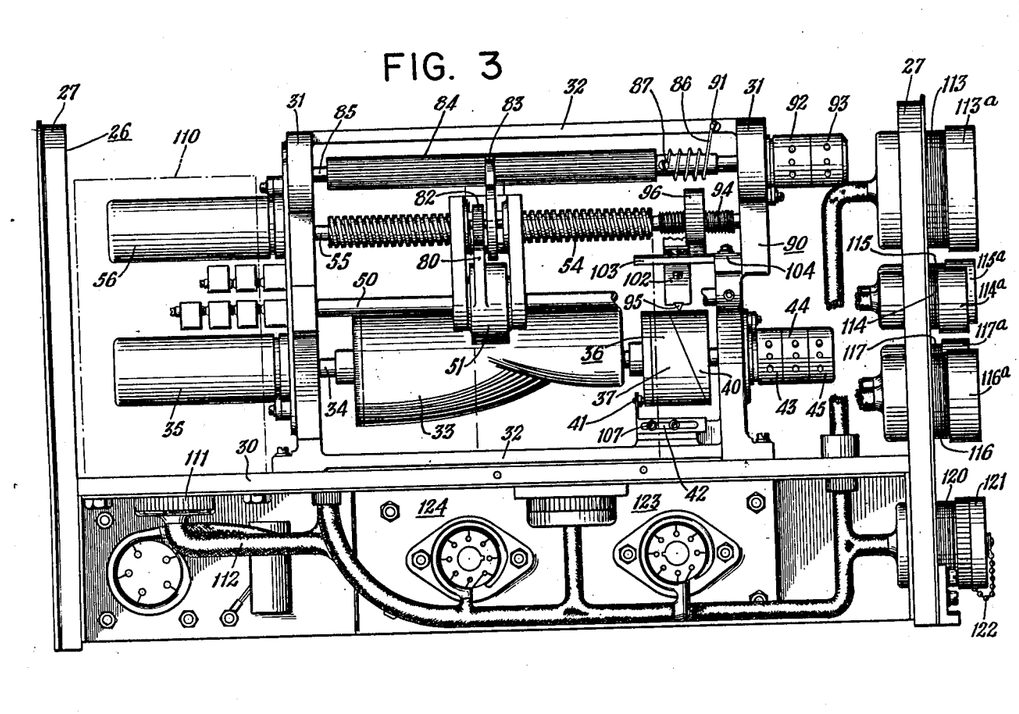
Figure 3 is a front elevational view with parts removed, of the computer apparatus.

Referring now to Figure 3, the entire computer mechanism is mounted on support 26 which comprises end frames 27 and cross beam 30. The support is formed by casting and, therefore, its components are integral one with another. Mounted on cross beam 30 is still another casting which includes end brackets 31 and cross members 32. The three dimensional cam 33 is keyed to shaft 34 journaled in end brackets 31. The shaft extends through the left-hand bracket where it is coupled to the shaft of servo motor 35. To the right of cam 33 and also mounted on shaft 34 is the region of applicability device 36, the surface of which is divided into two sections. A first section is an electrically conductive segment 37 while the second section is a non-conductive or insulated segment 40. The end of the device adjacent conductive segment 37 is contiguous therewith and is of the same conductive material. A contact 41, secured to the adjustable member 42, is maintained in contact with the conducting end of device 36. Again returning to shaft 34, it is seen to pass through the right-hand end bracket 31 whereupon it serves as the shaft to which the movable contacts or brushes of gang potentiometers 43, 44 and 45, respectively, are secured. In operation, as will be explained more specifically hereinafter, servo motor 35, in response to signals transmitted to it, will rotate the three dimensional cam to a position corresponding to the target angle. Electric voltages corresponding to the position of the cam and hence the target angle will be provided by the potentiometers and will be available for use in circuits as later described.

Turning now to the mechanism for positioning the cam follower 46 longitudinally with respect to the axis of three dimensional cam 33, it is to be observed that follower assembly 47 is supported for sliding movement on the rod 50 which is held in end brackets 31.

Figure 4:
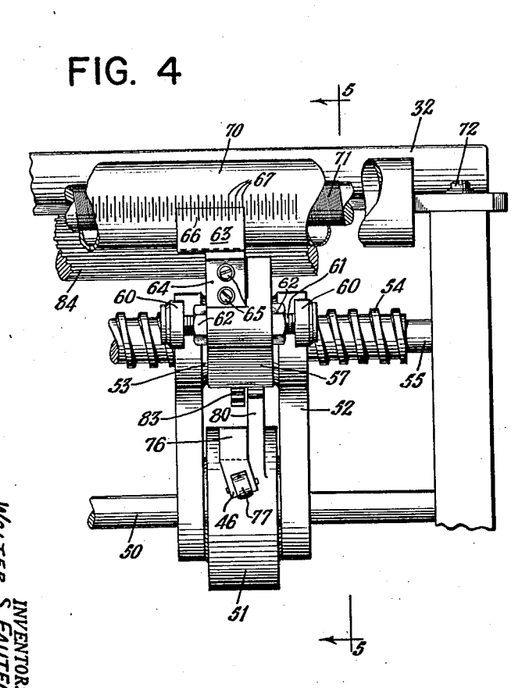
Figure 4 is a rear elevational view, with parts removed, of the computer showing particularly the cam follower mechanism.

The follower assembly 47 comprises a central hub 51 of generally cylindrical shape, and a pair of bell crank like arms 52 at both ends thereof. The arms are separated from the hub so that there may be relative movement of the hub about rod 50. However, the spacing between the internal sides of the arms is very nearly equal to the thickness of the hub so that there is no free movement between the elements in a longitudinal direction. The extremities of the horizontally disposed sections of bell crank arms 52 are separated by spacer member 53 (Fig. 4), the sections and member being integral and internally threaded for engagement with the lead screw 54 formed on shaft 55 which is journaled in end brackets 31. The shaft extends through one bracket (the left-hand one in Figure 3) to servo motor 56 which is actuated in a manner and under the control of components to be hereinafter described.

Projecting from spacer 53 is the upstanding lug 57 from the sides of which extend bumpers or stop members 60. These members while of a neoprene material may be formed of any suitable material and are mounted on screws 61 which are threaded into lug 57. A pair of lock nuts 62 are provided for securing the stop members in an adjusted position. A scale 63, provided for adjustment purposes, is mounted atop the angle bracket 64 fastened to lug 57 by a pair of metal screws 65. The markings 66 of the scale 63 are disposed oppositely to the dial markings 67 provided on the cylindrical cover 70 concentric with and spaced from the windings of slide potentiometer 71. The potentiometer and the cover are an integral unit and are fastened to a top surface of the end brackets 31 by a pair of bolts 72. Provided in the underside of the cover 70 is a slot 73 extending longitudinally the length of the cover, through which projects the sliding brush 74 carried by the follower assembly 47, or more particularly, the lug 57. A "third rail" 75 is also shown whereby electrical connection is made to the brush 74. The circuit in which this potentiometer is used will be described later, but it is clear that the voltage obtained therefrom will be proportional to the longitudinal position of follower assembly 47 on cam 33, or more specifically as has been seen from the previous discussion of the three dimensional cam, the voltage will be proportional to the Y factor.

Figure 5:
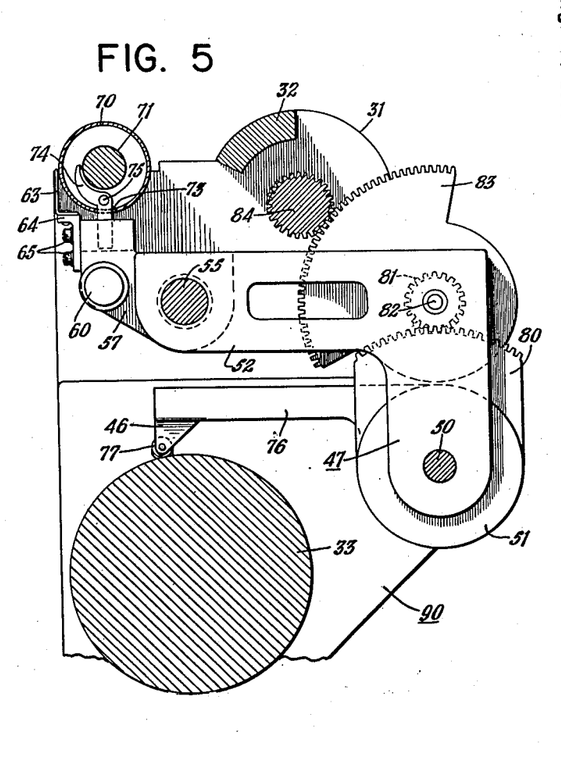
Figure 5 is a view taken along line 5—5 of Fig. 4.

Returning again to the central hub 51 of follower assembly 47, a horizontally disposed arm 76 extending rearwardly (Fig. 5) carries a follower roller 77 on the pendant extremity thereof. As will be noted (Fig. 4) the pendant portion of the arm is offset slightly to permit the roller to more readily follow the contour of the cam. A gear segment 80 projecting vertically from the hub engages small pinion gear 81 which is keyed to shaft 82, the latter being supported in arms 52 for rotative movement. Also keyed to shaft 82 is gear segment 83 which, in turn, engages the elongated gear 84 formed on shaft 85, the shaft being journaled in end brackets 31 of supporting frame 90. A coil spring 86 securely fastened to shaft 85 by screw 87 and to the rear cross bar 32 of supporting frame 90 by screw 91 urges the shaft and the gear counterclockwise (Fig. 6) to a "home" position wherein the cam follower roller 77 is in engagement with the surface of cam 33. Shaft 85 extends through the rightward end of bracket 31 (Fig. 3) and is connected to the movable brush arms of potentiometers 92 and 93. Since, as was hereinabove shown, the radius of cam 33 is proportional to the theoretical angle of divergence E, the setting of the potentiometers 92 and 93 will enable one to pick off a voltage or voltages which is proportional to such angle. Of course, the particular setting of the potentiometers will be determined by the cam parameters which, in turn, are based on the position of rotation of the cam and the longitudinal position of the cam follower, or the target angle B and the Y factor, respectively.

The lead screw 54 which, in length, is substantially coextensive with the length of cam 33, has a second lead screw 94 with a finer pitch adjacent thereto on the same shaft 55. This second lead screw controls the position of the movable contact 95 of region of applicability device 36. A block 96 (Fig. 8) is provided for travel along the lead screw. The rear side thereof is bifurcated to form a notch 97 which rides on rod 100 projecting from the right-hand end bracket 31 of frame 90 to thereby give two point support for the block. An angularly disposed L 101 forms the mounting means for the strap-like conductor 102, the lower end of which is provided with movable contact 95 and the upper end of which slideably engages the cantilever supported third rail 103. An insulator member 104 is interposed between the third rail and the end bracket 31 and a screw 105 is furnished to rigidly secure the members of the structure. Another screw 106 is provided to enable connection of an electric conductor to the unit, a circuit being traceable from the conductor, to third rail 103, strap 102, movable contact 95, conducting section 37 of device 36, stationary contact 41, and terminal screw 107. Of course, if the device is so positioned that movable contact 95 is engaging the insulator section 40 of the device 36, the circuit will be interrupted. Again, the description of the function of the region of applicability device will be deferred to a point later in the specification when the circuitry is described at which time the purpose thereof will be manifested.

The following brief description is intended merely to point out the relative location of various electrical elements or components in the computer assembly; the details of such elements either being known to those familiar with the electronic art or to be described hereinafter with reference to the electric circuitry.

Figure 10:
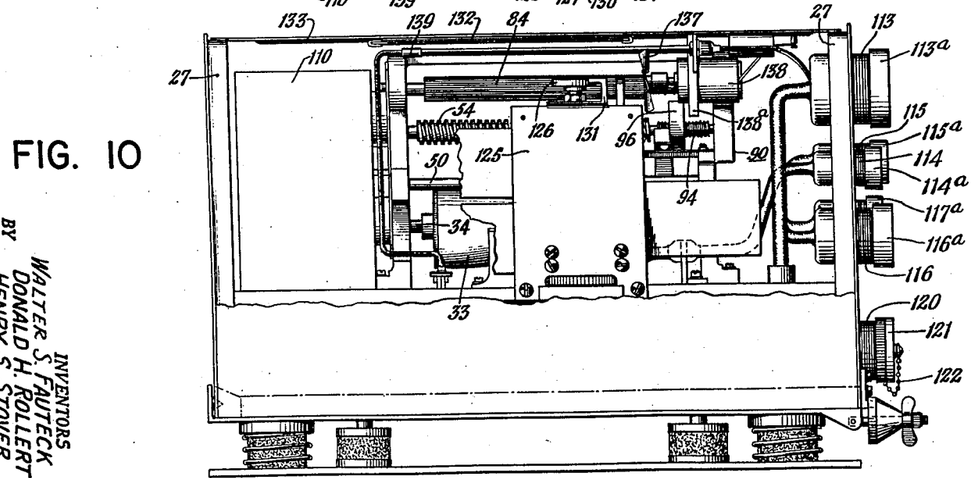
Figure 10 is a rear elevational view, with parts removed, of the computer apparatus and enclosure, also showing the mounting devices therefor.

A transformer box 110 (Fig. 10), shown mounted on cross member 30 of casting 26, contains the plurality of transformers used in the present system. Circuit connections are made to the transformers through electrical connector 111 and cable 112. Individual conductors from the transformer pack may terminate in any of the external electrical connectors shown mounted on the right side wall (Fig. 3) of the computer assembly depending on which unit of the overall bombing apparatus the particular circuit is to be connected. For example, if one of the conductors is to be connected to the main power unit, the conductor will terminate in main power connector 113. If the circuit is to be made to the gyroscope unit, the conductor will terminate in gyro unit connector 114. On the other hand, if the circuit is to be made to the signal apparatus, i.e. signal lights, the conductor will be connected to signal connector 115. Those conductors which are for circuit connections to the transducer will terminate in transducer connector 116, and those to be connected to the operating box will be connected to operating box connector 117. Each of these connectors is provided with a disposable cap 113a etc., which may be discarded when the apparatus is assembled in the aircraft for which it is provided. An additional connector 120 is provided and certain test points in the circuitry are connected thereto. In this manner certain testing or calibration procedures can be readily effected after assembly of the computer unit. Since connections to external testing or calibrating apparatus will not be made except during a testing or calibration procedure, a cap 121 is provided which is secured to unit by means of chain 122.

It will be appreciated that by dividing the electrical conductors which are to leave computer unit 23 into groups depending on the unit to which electrical connection is to be made, the advantages of unit construction are obtained. Thus, if in the overall assembly it is desired to replace, for example, the transducer unit, the electrical connections between the transducer unit and the computer unit is interrupted by "disconnecting the connections" at connector 116. In similar fashion any one or more of the units can be replaced conveniently and expeditiously when it is desired to do so either because a unit has been damaged or if it has been removed temporarily in order to be calibrated.

In addition to the transformer pack 110, there is provided magnetic amplifier assembly 123 and magnetic amplifier assembly 124. The former of these is employed in the circuits associated with servo motor 35 and is therefore responsive to the angle of dive when sighting the target. Electrical connections exist between this amplifier and the gyroscope through gyro connector 114. The latter amplifier 124, is utilized in the circuits associated with servo motor 56 and is therefore found in the circuitry for calculating the Y factor hereinabove discussed.

Figure 9:
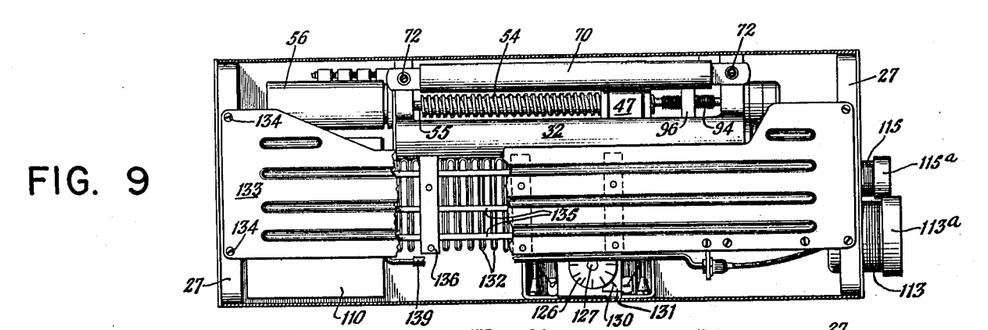
Figure 9 is a top plan view, with parts removed, of the computer apparatus and enclosure.

Electric relays and other electrical components such as an accelerometer are within sheet aluminum enclosure 125 and mounted on supporting pieces traversing the front of casting 26. Above the enclosure and physically connected to a component therein is dial 126 (Fig. 9) supported on rotatable shaft 127. The markings on the dial cooperate with index 130 on the angle member 131. Adjustment of the dial is effective to calibrate the bombing apparatus to the bore sight of the particular aircraft in which the apparatus is provided; the bore sight being the optical or aiming sight of the aircraft. A calibration or adjustment mechanism is provided since the angle between the optical sight axis and the zero lift axis of the aircraft, might vary from one aircraft to another, particularly when different type aircraft are considered. This will be more specifically understood when the angle of attack correction is later discussed.

Since the apparatus herein provided is applicable for releasing a bomb from varying altitudes and, furthermore, since an aircraft making a diving approach to a target generally undergoes a wide altitude change from the initiation of the dive to the pullout therefrom, the apparatus consequently encounters a wide temperature gradient. Of course, it is known that changing temperatures affect the parameters of electrical components and in an instrument of the type here disclosed such changing temperatures would adversely affect its performance. Therefore, a heating element 132 is provided within the computer unit enclosure. The element is secured to plate 133 fastened to the top of support 27 by a plurality of screws 134. A number of longitudinal strips 135 separate the element itself from plate 133 and several brackets 136 spaced along strips 135 hold the element firmly in place. A fan 137 driven by a small motor 138 supported in bracket 138a circulates the warm air within the enclosure. Within a relatively small range, the temperature is maintained by thermostat 139 which, when the temperature reaches too high a value, interrupts the circuit to the heating element. When the temperature within the enclosure falls to a lower predetermined value, the thermostat is actuated to reactivate heating element 132. The fan is in operation at all times.

Attention is now directed to the electrical circuits wherein many of the elements heretofore referred to generally, or as part of a group of elements, will now be described in greater detail. Other elements which were more particularly characterized will again be referred to and will bear the same reference numeral used when describing the mechanics of the apparatus.

Reference was previously made to Fig. 2 and Equation 5 developed therefrom. Applying that analysis to bombing from an aircraft, if the aircraft is at a height $Y_0$ diving toward the target T at an angle B while traveling at a speed $V_0$, the angle of divergence E is the angle that projectile or bomb must be elevated above the dive path in order to intersect the target. The sight line angle during the dive, i.e., the target angle, can be measured with a gyroscope, altitude as a function of the static pressure at the aircraft, and velocity as a function of the impact pressure on the aircraft. Thus E can be explicitly determined from measureable quantities.

As was hereinbefore noted, the angle of divergence E is calculated by means of a three dimensional cam, the rotation of which is proportional to B and the longitudinal position of the cam follower with respect thereto is proportional to Y.

In the practice of bombing from an airplane, it would not be desirable to release a bomb during the dive as would have to be done if the equation for angle E was used without correction. Great difficulty would be encountered in elevating the projectile or bomb above the flight line of the aircraft and ejecting it at the proper angle. In aerial bombardment it is much more desirable merely to release the bomb; this means that its initial speed and direction are that of the aircraft at the time of release.

Figure 13:
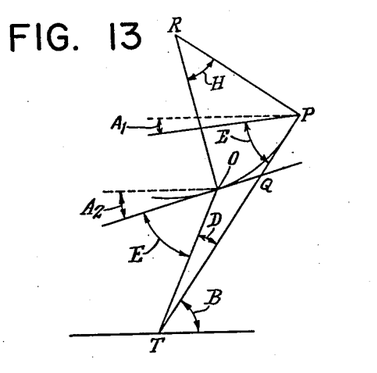
Figure 13 is a diagrammatic view of the flight path of the aircraft and illustrating various angles referred to in the specification.

In executing the toss bomb maneuver, the pilot dives the aircraft at the target T (Fig. 13). At some point P, which can be anywhere on the dive path within certain wide limits as determined by the region of applicability inherent in the apparatus, it being understood that such region of applicability can be extended as desired, the pilot begins a pull out. As can be seen from the drawing and is readily apparent, the velocity vector of a projectile released at any point on the pull out arc will be tangent to the arc at the point of release. In order to intersect the target, the bomb must be released at that point on the pull out arc where the tangent to the arc is elevated above the aircraft target line (OT) by the divergence angle plus an angle dependant on the elements of aim to be corrected for.

It is to be noted, however, that there is no easy way to fix the plane-target line during pull out. During the dive the target angle equals the angle between the direction of sight and the horizontal; this can be measured by a gyroscope and introduced into the system to position three dimensional cam 33. By the time the aircraft has proceeded along the pull out arc to a point that will give the divergence angle that was computed in the cam at P, that divergence angle is no longer correct because the value of B that was introduced into the cam no longer specifies the true target angle. Nor can the gyro angle at point 0 be used directly to position the cam 33 since it does not measure the target angle.

Let the divergence angle computed at the point P at which the pull out is initiated, be E and its angle of departure $A_1$ (Fig. 13). If the same divergence angle is applied after the plane proceeds in the pull out arc to point 0, the new angle of departure $A_2$ will be related to $A_1$ by the equation $$A_2 = A_1 + D \qquad (6)$$

where D is the angle between the dive line PT and the line from the aircraft to the target OT. In order that the initial velocity vector of the projectile make the angle with the horizontal that was computed at pickle point P, it consequently is necessary to increase the divergence computed there from E to $E+D$.

The angle D which is termed the angle of parallax, is computed by the following equation:

$$D = K \frac{(E-5)(75-B)}{n} \qquad (7)$$

where $n$ is the number of $g$'s acceleration during the pull out. The equation is an empirical one, based on a study of air flight maneuvers which showed that, at the speeds traveled by aircraft using the present apparatus, the pull out path is not of constant radius. Therefore, the assumption was made, and the results found to accord with requirements, that an average acceleration during pull out can be determined for each type of aircraft and this average acceleration introduced in the equation as a fixed quantity to give the angle D within the accuracy requirements of bombing. Considering only the correction due to the angle of parallax it can be said that the bomb can be released at that point in the pull out path where the gyro angle $A_2$ plus the angle of divergence E equals the target angle B plus the angle of parallax D.

It is worth noting that although the angle B input to the three dimensional cam is frozen at the point at which the pull out from the dive is initiated, the Y input to the cam follower is not. Consequently the value of divergence angle obtained from the cam will itself change as the pull out arc is traversed. What the cam yields during pull out, therefore, is a hybrid divergence angle resulting from freezing one input at the beginning of the pull out and letting the other vary during the pull out. This tends to correct for the change of altitude between pickle and release.

In a true bombing situation, it is necessary to allow for the resistance of the air through which the projectile is falling. This resistance will result in the horizontal range being smaller than it would be if the projectile moved in a vacuum. This range reduction is compensated for by applying a correction F to the angle of divergence that was computed by the three dimensional cam for the vacuum trajectory according to the foregoing equation for E. The correction F is given by the following equation:

$$F = c \frac{(P_1 - Pm)}{(B - 1.5)} \qquad (8)$$

where $c$ is a function of the bomb drag coefficient, $P_1$ is the static pressure at the target in inches of mercury, and $Pm$ is the static pressure at the altitude of the aircraft. In the derivation of the equation, it was assumed that the bomb drag coefficient is constant for a particular type bomb in the average speed range in which the present apparatus finds application.

Another correction which must be applied in the apparatus is that stemming from wind conditions. The principal effect of wind on bombing is that it gives the aircraft and the bomb a drift downwind at the release height. This drift is retained by the bomb as it falls, and would cause the bomb to miss the target if a compensating factor therefor is not introduced. As is true of the other corrections, that for wind is applied to the angle of divergence produced by the three dimensional cam. It is computed by the following equation:

$$w = \frac{\text{wind in knots}}{10} \qquad (9)$$

where $w$ is the horizontal component of the wind velocity and it is assumed that the wind effect after release is negligible.

Figure 14:
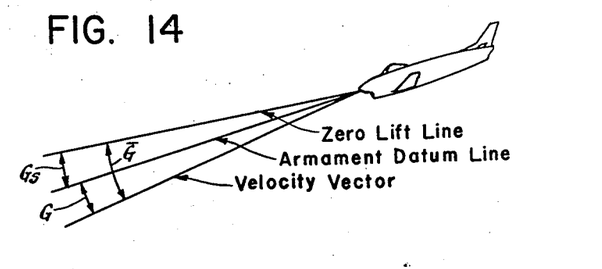
Figure 14 is a diagrammatic view of an aircraft showing various reference lines thereof.

In an aircraft, the armament data line can be precisely located without reference to flight characteristics since it is the boresight line of the weapons of the plane. This normally will not coincide with the direction of motion of the aircraft, because the angle the aircraft must make with the flight line in order to remain airborne will depend upon the speed of the plane and on the acceleration of any maneuver in which the plane may be engaged. The angle between the armament data line and the direction of flight is termed G (Fig. 14). There is further shown the zero-lift line and the angle between it and the armament data line is $Gs$. The total angle $\bar{G}$ is equal to G plus $Gs$. Now the angle made by the plane with the horizontal is furnished by a gyroscope that is aligned with the armament data line. This value will be in error by an amount equal to G. Since this angle is used together with the divergence angle E to determine the point of release, it is necessary to correct for the angle of attack $\bar{G}$ and this is computed by the equation $$\bar{G} = K_1 \frac{Wn}{Qc} \qquad (10)$$

where W is the weight of the aircraft and its stores and $n$ is the number of $g$'s of vertical acceleration during the maneuver. $Qc$ is the impact pressure on the aircraft and $K_1$ is a constant for a particular aircraft that takes into account the wing area and other characteristics of the aircraft in flight. W is set into the apparatus by the pilot, $n$ is obtained from an accelerometer, $Qc$ is fed into the computing circuit by a transducer, and $K_1$ is allowed for in the adjustment and calibration of the computer.

The effect of the corrections can best be understood if note is taken that the uncorrected divergence angle E is equal to the uncorrected angle H swept out by the plane in its pull out. For in Fig. 13 the sum of the angles in quadrilateral PQOR must be 360 degrees; and since the other two angles are right angles, angles H and E must be equal. Then the corrections to E that have been described previously can be considered as corrections to the angle of pull out. The angle E (the uncorrected or theoretical angle of divergence) is reduced by D, the parallax correction; increased by F, the bomb drag correction; decreased by $\bar{G}$, the angle of attack correction; and increased or decreased by $w$ depending on whether there is a headwind or a tailwind.

Before proceeding to the actual circuits used in mechanizing the empirical equations, it is thought best to review electrical computational circuits which perform the basic arithmetical operations of addition, subtraction, multiplication and division.

Figure 15:
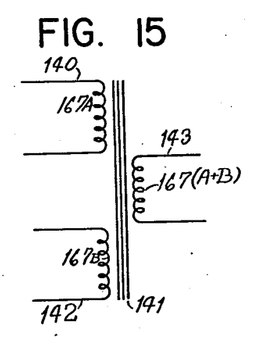
Figure 15 is a schematic representation of an electrical circuit used for adding purposes.

In the present toss bomb apparatus, 1 degree is equivalent to .167 volts. Therefore, in order to perform the additive operation, A degrees plus B degrees, one simply adds the quantities .167A volt and .167B volt. One means of achieving this addition is through the use of transformers (Fig. 15). If voltage .167A is impressed across primary 140 of transformer 141 and voltage .167B is impressed across primary 142, voltage .167 $(A+B)$ will be found on the transformer secondary 143 terminals. The foregoing assumes a turns ratio of unity; however, if some other ratio is used, the voltage across the secondary will be multiplied by a constant.

Figure 16:
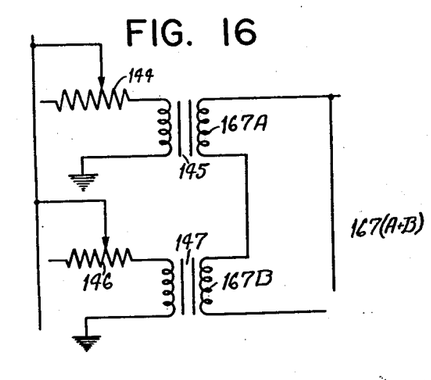
Figure 16 is a schematic representation of another electrical circuit used for adding purposes.

Instead of performing an addition operation by the use of a transformer, it is possible to use the circuit of Fig. 16 wherein the transformers are used for purposes of isolation while potentiometers are used for adding purposes. If potentiometer 144 is adjusted so that the voltage .167A is exhibited across the secondary of transformer 145 and potentiometer 146 is adjusted so that voltage .167B is exhibited across the secondary of transformer 147, the desired summation voltage of .167 $(A+B)$ will appear across the series connected transformer secondaries. It is, of course, possible to vary the placement of the components in this summation or additive circuit.

Subtraction can be considered to be but a special case of addition. By reversing the direction of application of one of the voltages or by changing its phase as by reversing a transformer winding, the result .167 $(A-B)$ can be obtained by the same method of mechanization.

Figure 17:
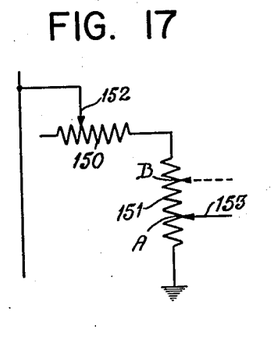
Figure 17 is a schematic representation of an electrical circuit used for multiplication purposes.

The basic multiplication circuit is shown in Figure 17, where 150 and 151 are linear potentiometers. Now if the adjustable brush 152 of potentiometer 150 is set so that the voltage drop from "A" to ground on potentiometer 151 is .167A volt, then if the brush 153 is moved to a point "B" at which the distance to the ground connection is B times as great as the distance from "A" to the ground connection, the voltage output of the potentiometer 151 will be .167AB. It should also be apparent that multiplication by a constant can often be accomplished in a step-up or step-down transformer.

Figure 18:
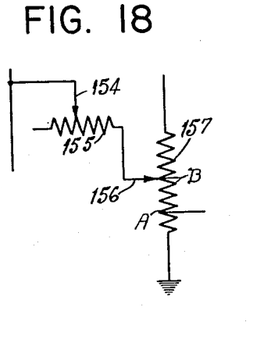
Figure 18 is a schematic representation of an electrical circuit used for division purposes.

A slight modification to the circuit of Figure 17 adapts it for performing the division function. (See Fig. 18). In this circuit if the brush 154 of potentiometer 155 is set so that the voltage drop from "A" to ground with the brush 156 of potentiometer 157 set at "A" is .167A, then if brush 156 is moved to a point "B" which is B times as distant from ground as "A" is, the voltage drop from "A" to ground will be .167 $(A/B)$ volts.

Having thus described the basic circuitry for performing the arithmetical functions, attention can now be directed to the circuits employed in the present apparatus. In each case the equation to be solved followed by the circuit for effecting the solution will be given, but in no instance will the derivation of the equation be presented other than the explanation given above. Suffice it to say that the present apparatus has been found eminently satisfactory in practice.

Figure 19:
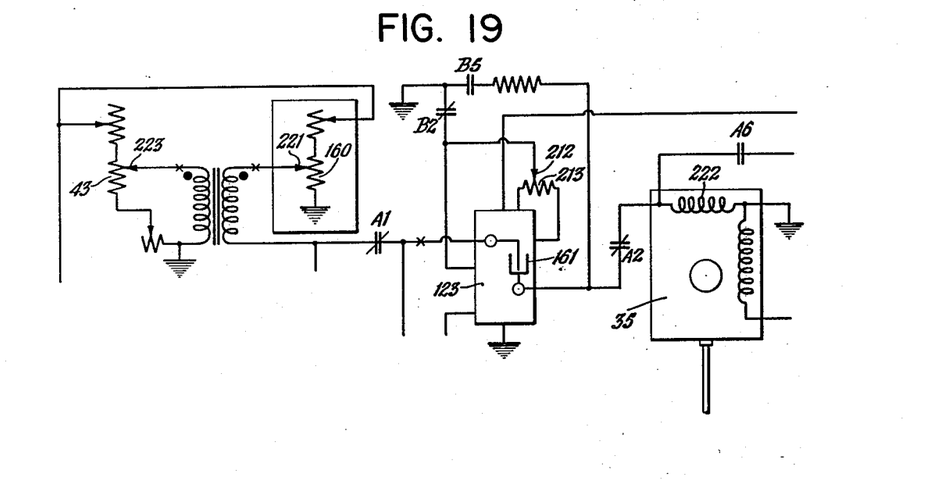
Figure 19 is a schematic representation of the target angle servo loop circuit.

Reference is first made to Fig. 19 wherein is shown the target angle servo loop. In the present instrument, a vertical gyroscope with a potentiometer pick off in the pitch axis is used to indicate the target angle at the point of pickle since at this instant the target angle and the sight line angle are the same. The gyroscope potentiometer 160 and the target angle feedback potentiometer 43 are connected in the bridge network shown, the brush of potentiometer 43 being mounted on the shaft of servo motor 35 together with three dimensional cam 33 and movable therewith. In this manner the cam is positioned radially in accordance with the target or sight line angle indicated by the gyroscope. A magnetic amplifier 123 is provided for the usual purposes. However, a capacitor 161 is provided therein to limit the gain of the amplifier by feedback principals and thereby establish stability of the servo loop.

Figure 20:
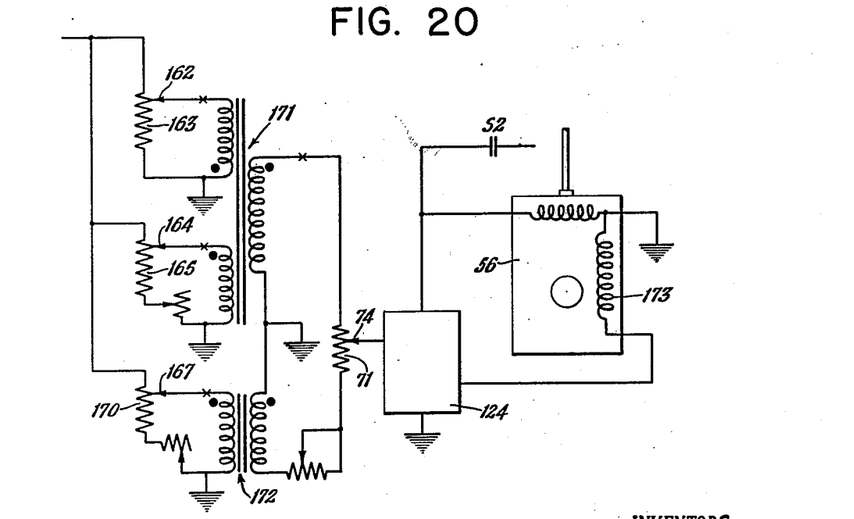
Figure 20 is a schematic representation of the "Y" factor servo loop circuit.

Reference is now made to Fig. 20 wherein is shown the L servo loop which is responsive to the factors determinative of the "Y" factor hereinabove defined as equal to $$\frac{2gY_2}{V_0}$$

Figure 11:
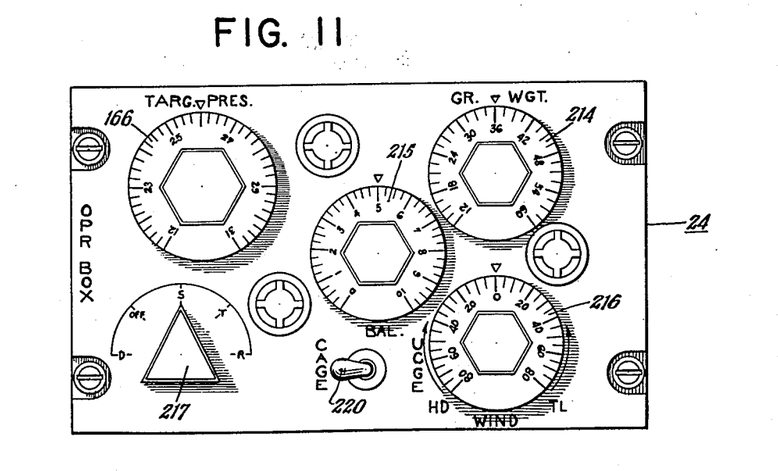
Figure 11 is a front elevational view showing the various control knobs of the operating box.
Figure 12:
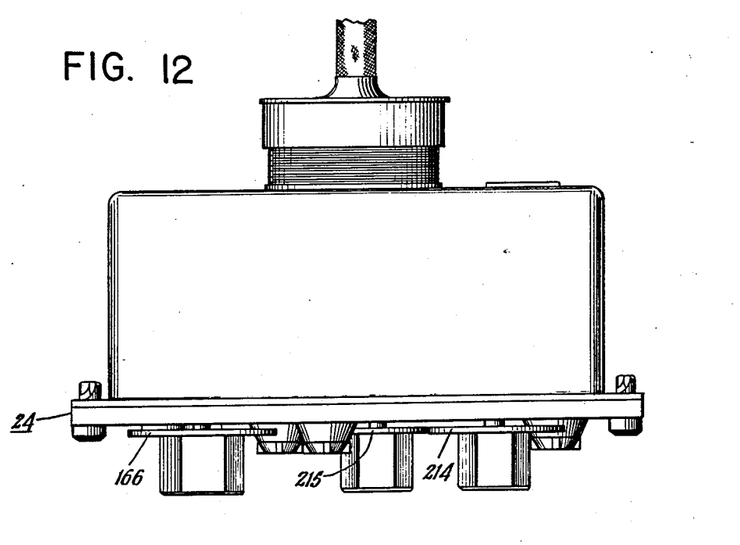
Figure 12 is a top plan view of the mechanism of Fig. 11.

The present instrument does not directly measure either velocity (V) or altitude $Y_0$. However, the velocity and altitude are functions of impact or dynamic air pressure and static air pressure, respectively, and the transducer connected to the Pitot-static system of the aircraft provides the "Y" factor servo loop with voltages proportional to the above pressures. If $Pm$ is the static pressure of a free stream outside the aircraft, $Qc$ is the impact pressure at the aircraft and $P_1$ is the static pressure at the target, then $$P = \frac{P_1 - Pm}{Qc} \qquad (11)$$

and P can be shown to bear a relationship to "Y." That is, $Y=f(P)$. The brush 162 of potentiometer 163 is set by the transducer mechanism in accordance with the static pressure at the aircraft, i.e. $Pm$, while the brush 164 of potentiometer 165 is set by the pilot in accordance with intelligence data received by him prior to the bombing attack, the potentiometer being in the operating box 24 and the setting being made through knob 166 (Fig. 11). Consequently the voltage output of potentiometer 165 is proportional to the static pressure at the target, i.e. $P_1$. The brush 167 of potentiometer 170 is set by the transducer mechanism in accordance with the impact pressure at the aircraft, and it, therefore, gives an output proportional to $Qc$. The marks located near the various transformer windings indicate the phase relationship of the transformer voltages. Since the primary transformer windings for $P_1$ and $Pm$ are 180° out of phase, the secondary of transformer 171 gives a voltage proportional to $P_1 - Pm$. The transformer 172 provides an output voltage proportional to $Qc$.

In an adaptation of the Wheatstone bridge circuit, the secondaries of transformers 171 and 172 and potentiometer 71 are connected in parallel and a bridge therebetween extends from the brush 74 of the potentiometer through the magnetic amplifier 124 to the control field 173 of "Y" factor servo motor 56. Brush 74 is mounted on cam follower 47 (Fig. 5) and is therefore actuated by motor 56. Consequently, the brush takes a position depending on the energization of field 173. The motor will continue to rotate and brush 74 sweep over the potentiometer winding until a null condition obtains at which time the position of brush 74 and hence the rotative position of motor 56 will be proportional to $$\frac{P_1-Pm}{Qc}$$

It will be recalled that "Y" factor servo motor 56 was used to translate the cam follower 47 (Fig. 3) longitudinally with respect to the cam.

Figure 21:
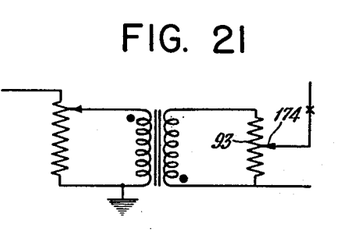
Figure 21 is a schematic representation of the theoretical angle of divergence circuit.

Inasmuch as the cam was rotated to a position in accordance with the target angle and the cam follower positioned in accordance with the "Y" factor, the radius of the cam at this point is a function of the theoretical angle of divergence E as above disclosed. The theoretical solution to the bombing problem is "stored" in the computer in the circuit of Fig. 21 wherein the position of brush 174 on the winding of potentiometer 93 is representative of the theoretical angle of divergence E, the brush position being controlled through gear 84 by the position of follower 46 on cam 33.

In executing the toss bombing maneuver, the pilot dives the plane at the target and, after fixing the target in his gun sight, begins to pull out from the dive. As is readily apparent, the velocity vector of a projectile released at any point on the pull out arc will be tangent to the arc at the point of release. In order to hit the target, the projectile must be elevated above the plane target line QT (Fig. 13) by the corrected divergence angle.

Figure 22:
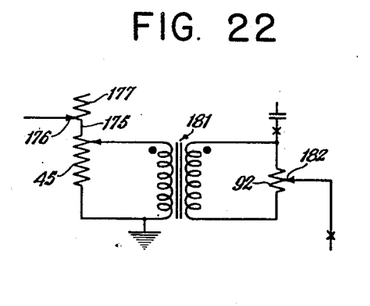
Figure 22 is a schematic representation of the angle of parallax correction circuit.

The first correction to be applied to the theoretical angle of divergence E is that due to parallax. As was heretofore noted, the angle of parallax was defined by Equation 7, i.e.

$$D=K\frac{(E-5)(75-B)}{n}$$

and the mechanization therefor will be described by reference to Fig. 22 which shows the angle of parallax circuit. It was above stated that, based on a study of air flight maneuvers, it would be satisfactory to mechanize the equation for an average acceleration during pull out and that such acceleration will be a fixed quantity for a particular type of aircraft. Of course, the value of the average acceleration may vary from one type aircraft to another. A voltage proportional to one over the average acceleration or $1/n$ is produced at point 175 by the adjustment of brush 176 on rheostat 177. $1/n$ is adjusted to conform to the maneuver characteristics of the particular type aircraft in which the apparatus is used. The brush 180 of potentiometer 45 is driven by the target angle servo loop, that is by the shaft of the three dimensional cam as it is rotated by servo motor 35. It is calibrated so that the primary of transformer 181 will be shorted out when B equals 75°. The voltage across the secondary is divided proportional to $E-5$ as by brush 182 traversing the winding of potentiometer 92. The brush is actuated according to the position of cam follower 46 on cam 33 and is phased so that the voltage output is zero until the angle of divergence E equals 5°.

Figure 23:
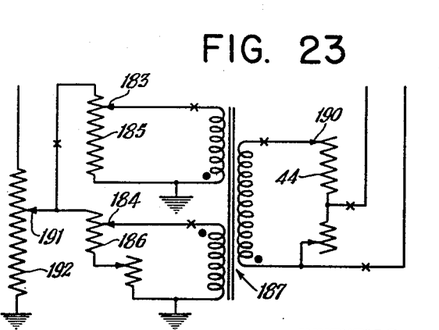
Figure 23 is a schematic representation of the bomb drag correction circuit.

A second correction to be applied to theoretical angle of divergence E and previously discussed, is that due to the resistance of the air through which the bomb or projectile is falling. The correction was given by Equation 8, i.e.

$$F=c\frac{(P_1-Pm)}{(B-1.5)}$$

and is mechanized according to the circuit of Fig. 23. The brushes 183 and 184 of potentiometers 185 and 186 are set by the transducer mechanism to give $P_1$ and the control knob 166 to give $Pm$, respectively. Each potentiometer is connected to a primary winding of transformer 187 in such manner that a subtracting operation takes place. The secondary of the transformer is connected through brush 190 to potentiometer 44 whereby the division operation indicated in the equation is effected. The position of brush 190 on the potentiometer winding is controlled by the target angle servo inasmuch as it is mounted on the three dimensional cam shaft and it therefore gives the value B. The brush 191 is positioned along potentiometer 192 in accordance with the type of bomb employed. For a particular type bomb, the setting of the brush remains fixed.

Figure 24:
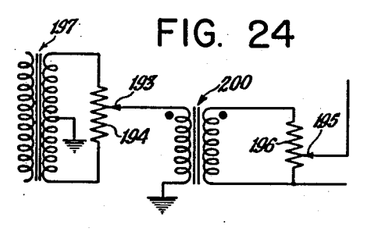
Figure 24 is a schematic representation of the wind correction circuit.

A still further correction, to which reference was previously made, is that due to the wind encountered by the aircraft and the target. The equation used to correct for wind effects is Equation 9, i.e.

$$w=\frac{\text{wind in knots}}{10}$$

and its mechanization is shown in the circuit of Fig. 24. Since it is difficult to measure the horizontal component of wind velocity as the aircraft is diving, the equation is an approximation. Its mechanization is shown in Fig. 24 where brush 193 of potentiometer 194 is set by the pilot before take-off in accordance with military intelligence regarding weather conditions, particularly wind velocity, at the target site. Brush 195 is set on potentiometer 196 when the apparatus is calibrated and remains fixed thereafter. It will be noted that potentiometer 194 is connected across the terminals of a grounded center tap transformer 197. In this manner, depending on the setting of brush 193, the phase connection of transformer 200 is controlled and the voltage output of the circuit may thereby be controlled as to phase depending on whether there is a headwind or a tailwind.

Figure 25:
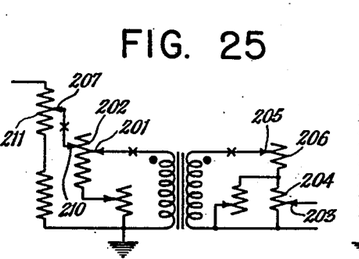
Figure 25 is a schematic representation of the angle of attack correction circuit.

The last correction to be made to the theoretical angle of divergence E to provide a corrected angle suitable for actual flying conditions, is that known as the angle of attack correction. The Equation 10 therefore, i.e.

$$\bar{G}=K_1\frac{Wn}{Qc}$$

is mechanized according to the circuit of Fig. 25. W is the weight of the aircraft and its stores, $n$ is the number of $g$'s of vertical acceleration during pull out, $Qc$ is the impact pressure on the aircraft and K is a constant for a particular aircraft that takes into account the wing area and other characteristics of the aircraft in flight. W is set into the operating box 24 and results in the setting of brush 201 along the winding of potentiometer 202. $n$ is obtained from an accelerometer which positions brush 203 along potentiometer 204 while $Qc$ is fed into the computer from the transducer which positions brush 205 on the winding of potentiometer 206. K is allowed for in the adjustment and calibration of the computer during which brushes 207 and 210 are set on potentiometers 211 and 202, respectively, according to the type aircraft on which the apparatus is used.

Inasmuch as the foregoing equation and circuit introduces a correction based on $\bar{G}$, whereas the actual correction is based only on G, a further correction is necessary to subtract $Gs$ from $\bar{G}$. Since $Gs$ is a constant for a particular type aircraft, the correction is introduced in the summation circuit rather than in the particular angle of attack circuit. The latter correction is termed the bore sight correction and is introduced by a setting of brush 212 on resistor 213 (Fig. 27) directly in the magnetic amplifier 123 circuit. At the time this resistor is used, the amplifier circuit is being used only to control actuation of a relay to thereby effect release of the bomb.

Figure 26:
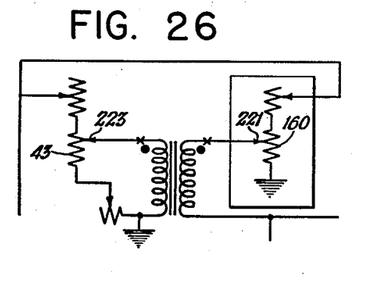
Figure 26 is a schematic representation of the angle of departure circuit.

As the aircraft traverses its pull out path, a voltage is provided in the circuit of Fig. 26 which represents the angle of departure $A_2$ of the aircraft at each instance. The position of brush 223 on potentiometer is fixed as when the rotation of cam 33 was frozen at pickle. The gyroscope actuated brush 221, however, continues to sweep potentiometer 160 as the gyroscope angle changes during pull out. The unbalanced bridge provides a voltage output R. This voltage, together with those provided by each of the circuits above described, are connected in a summation circuit which controls the point of release of the bomb during the pull out. The signal for bomb release is given at the predetermined point in the pull out path which may be defined by the equation:

$$R - E + D - F - G \pm w = 0$$

where the symbols represent the voltage outputs of the circuits for mechanizing the equations.

In operation, certain of the inputs to the computer may be introduced prior to the aircraft leaving its home base since the information relative thereto will be supplied by military intelligence rather than being measured by instruments at the target site. Thus, the pilot, generally, will pre-set certain components of the computer as by adjusting in operating box 24, the target pressure knob 166 in accordance with his target destination, the gross weight knob 214 in accordance with the estimated weight of the plane, plus stores, plus fuel over the target, and the ballistic knob 215 in accordance with the ballistic characteristic of the type bomb being employed. The wind characteristics may also be introduced by means of knob 216 but this information will most likely be introduced at the target. In fact, all of the information above mentioned may be introduced at the target, but since it generally will be known prior to the attack, it is introduced at that most opportune time. The selector switch 217 will be in standby position, marked "s," and the toggle switch 220 will be in the caged position. The latter simply locks the gyroscope relative to its pitch and roll axes.

After take-off, the pilot will move the selector switch to the position marked "T" which sets the apparatus for a toss bombing operation as by engaging switch contacts S1, S1a, S2, S3 and S4. As the target is approached, toggle switch 220 is thrown to the uncaged position and switch contacts S7 are thus engaged to free the gyroscope and enable its motor 226 to set it in reference position. Any adjustments may be made to the operating box knobs to condition the apparatus for the situation as it exists at the target if such situation changed from that known at the time of take-off. This would occur, for example, if the target destination was changed for one reason or another.

Thereafter, the pilot will enter into a diving maneuver and by means of the aircraft gun sight, direct the aircraft at the target. While thus aiming at the target, the wings are maintained in a horizontal position, i.e. the aircraft is vertical on the roll axis. The declination of the aircraft in the pitch axis results in the gyroscope controlled brush 221 being positioned on the gyroscope potentiometer 160 in accordance with the target angle B approach of the aircraft to the target. A voltage output is, therefore, obtained from the B servo loop circuit, which through the normally engaged contacts A1 and magnetic amplifier 123, contacts A2 completes a circuit for the energization of the target angle servo motor 35 control field 222. The motor, as heretofore described, is used to control the rotational position of the three dimensional cam 33. As the control field energization is continued, as by the voltage difference in the bridge circuit of the servo loop, motor 35 continues to rotate shaft 34 on which is mounted cam 33 and the brush arms of potentiometers 43, 44 and 45. The movement continues until brush 223 of potentiometer 43 is so positioned on the potentiometer winding that a null condition obtains in the bridge circuit, at which time further rotation of the motor 35, three dimensional cam 33, and the brush arms of potentiometers 43, 44 and 45 is arrested. As hereinabove described, the rotational position of cam 33 is representative of the angle B at which the aircraft approaches the target in a dive.

At the same time that the cam is being rotationally positioned as above, the Pitot static tube system of the plane is being utilized together with a transducer to set brush 162 on potentiometer 163 and provide a voltage Pm representative of the aircraft altitude and to set brush 167 on potentiometer 170 and so provide a voltage Qc representative of the aircraft speed. The voltage Pm is proportional to the static air pressure at the aircraft while voltage Qc is proportional to the dynamic air pressure. An additional voltage P1 is obtained from the setting of brush 164 on potentiometer 165 and is representative of the air pressure, i.e. altitude at the target. As heretofore noted, the setting of the brush 164 on potentiometer 165 will generally take place before the aircraft takes off when the target pressure knob 166 is set. These voltages are combined in the "Y" factor servo loop circuit and through magnetic amplifier 124 energizes the control winding 173 of servo motor 56. Since the voltages here described are functions of altitude and speed, and the "Y" factor, hereinabove defined with reference to the three dimensional cam 33 is also a function of altitude and speed, the servo motor 56 is used to position the cam follower 46 longitudinally along cam 33. Movement of the cam follower longitudinally with respect to the cam continues all the while the plane is diving and the parameters of the circuit changing. The rise of the cam at the point of intersection of the cam surface and the cam follower is proportional to the theoretical angle of divergence E which will result in the bomb striking the target when released in a toss bomb fashion. A voltage proportional to the theoretical angle of divergence is obtained from potentiometer 93, the brush 174 of which is positioned in accordance with the rise of the cam at the point of intersection of follower 46 and the cam surface.

As the aircraft continues its dive the servos are continually acting to position the cam and its follower in accordance with the changing flight conditions. Of course, if the dive angle is maintained constant, the rotative position of cam 33 is maintained fixed. The cam follower 46, however, continues to traverse the cam since the static pressure at the aircraft (the altitude of the aircraft) is continually changing and perhaps the dynamic pressure may be varying due to a variation in the speed of the aircraft.

Figures 6, 7, 8:
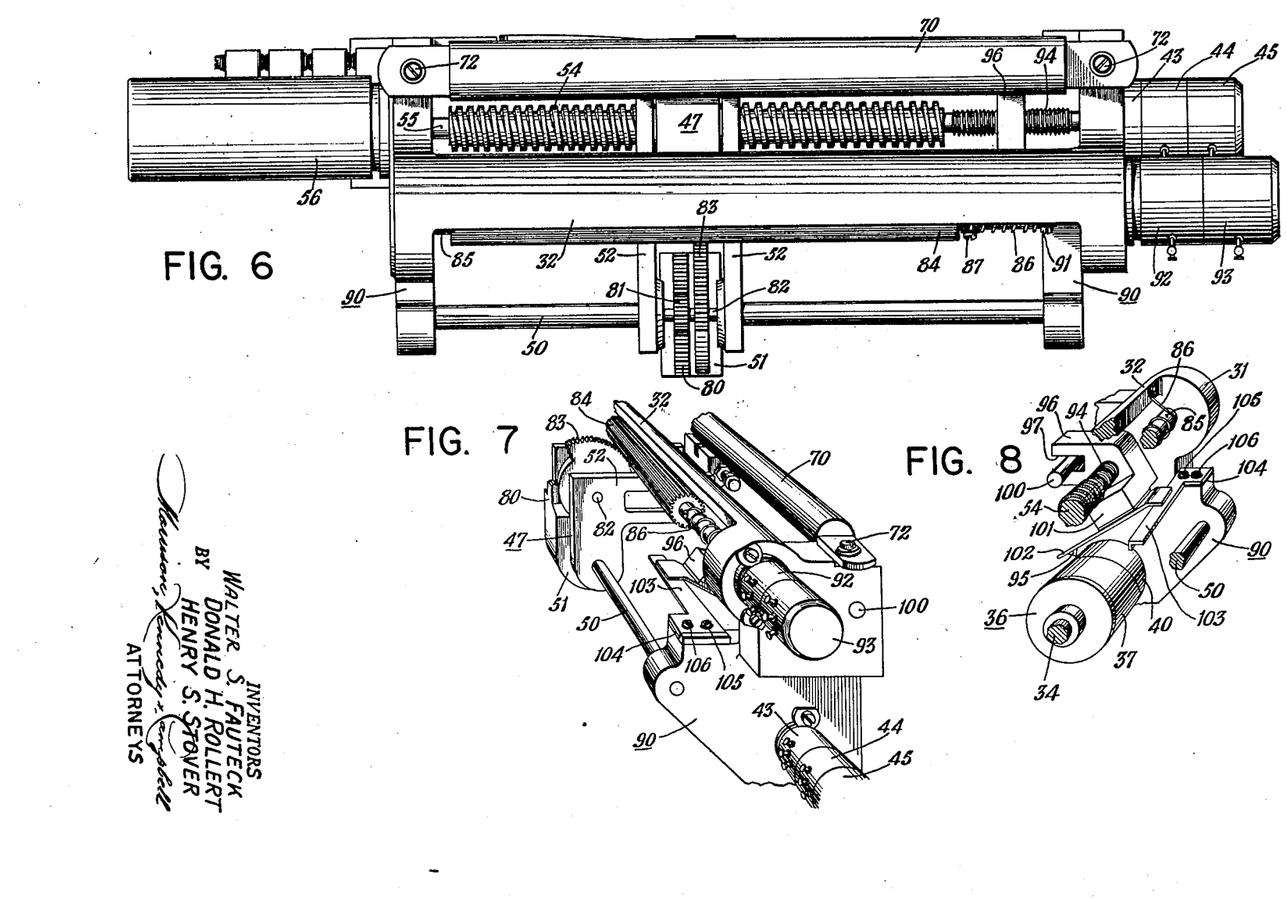
Figure 6 is a top plan view of the computer, additional parts removed, to show the cam follower mechanism.
Figure 7 is a perspective of the mechanism of Fig. 6.
Figure 8 is a perspective view, similar to Fig. 7, but taken in the opposite direction to show the region of applicability device.

Actuated in conjunction with the three dimensional cam and the cam follower is the region of applicability device 36, comprising the segments 36 and 37 and the follower contact 95 (Fig. 8). As the aircraft enters the region of applicability of the bombing apparatus, the device 36 is so rotatively positioned and the follower contact 95 is so longitudinally positioned that the conducting tact 95 is so longitudinally positioned that the conducting segment 36 of the device co-acts with contact 95. These are designated as switch S9 in the circuit diagram of Fig. 27. Thus, when the aircraft is in the region of applicability a circuit is completed through switch S9, normally engaged contacts C1 and "in limits" lamp 224. The illumination of the lamp serves as a signal to the pilot that he may at any time thereafter (assuming the lamp remains illuminated) pull out from the dive and have the bomb automatically released by the bombing apparatus.

At the instant the button 225 is depressed a circuit is completed through switch contacts 53 which engaged when the selector switch 217 was turned to the "T" position, to energize relay coil A and thereby separate contacts A1 and A2 and engage contacts A3, A4, A5 and A6. Button 225 is depressed at the instant the pilot starts the pull out from the dive provided he wants to release the bomb. Contacts A5 complete a circuit for the energization of relay coil B to separate contacts B1 and B2 and to engage contacts B3, B4 and B5. The separating of contacts A2 interrupts the circuit from the magnetic amplifier to the target angle servo motor control field 222 while the engagement of contacts A6 impresses a D.C. voltage across the field. This action places a holding torque on the motor to lock the armature in position. This means that throughout the remainder of the maneuver, the three dimensional cam will not turn in rotation, but will maintain the position corresponding to the target angle at the beginning of the pull out path.

The locking up of the servo motor 35 and cam 33 results in the positions of the brushes of potentiometers 43, 44 and 45 in the gyroscope, bomb drag and parallax circuits, respectively, being fixed to provide a voltage proportional to the target angle.

Separation of contacts A1 disconnects the gyroscope circuit from the input to the magnetic amplifier 123, while the engagement of contacts A3 result in the connection of the gyroscope circuit to the theoretical solution for angle of divergence circuit, as well as the correction factor circuits. The various circuits are connected to form a summation circuit shown in Fig. 27 which, when the voltage output therefrom is equal to zero volts, controls, through contacts A4, magnetic amplifier 123 to energize relay coil C, contacts B3 being engaged. Energization of the coil and the resulting engagement of contacts C2 complete a circuit through previously closed switch S9 and contacts B4 to the bomb release mechanism. At the same time separation of contacts C1 interrupts the circuit to "in limits" lamp 224 thereby extinguishing the lamp and thus indicating to the pilot that the bomb was released.

Figure 27:
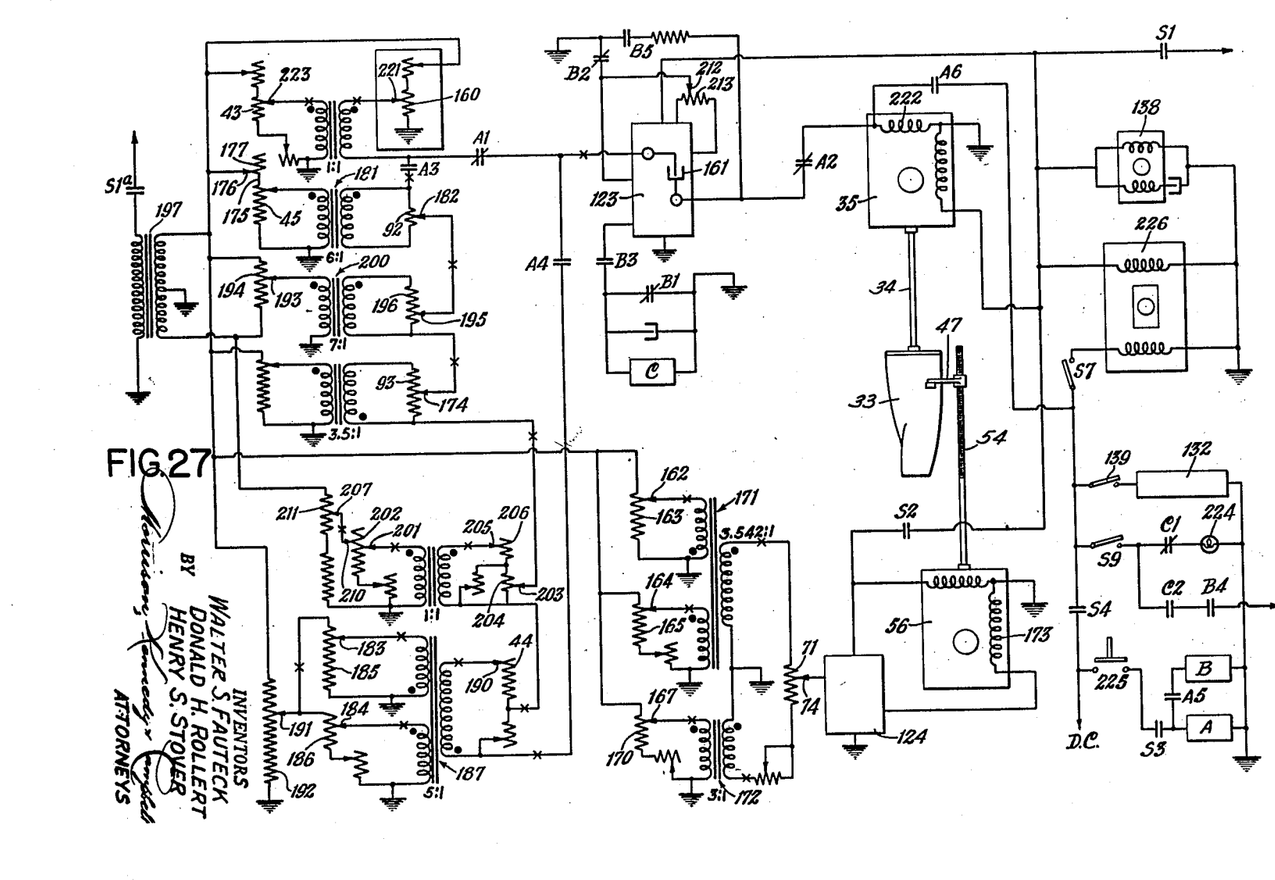
Figure 27 is a schematic representation of the entire toss bomb computer circuit.

In the circuit of Fig. 27, there will be found several cross or X markings on various conductors of the computer circuitry. These represent the test points by which calibration of the computer can be checked. As was noted earlier in the specification, these points are brought out to connector 120 (Fig. 3) so as to facilitate the connection of electrical measuring instruments to the various test points within the computer.

Having thus described the invention, it is to be understood that many changes could be made in the structure of circuits disclosed and many apparently widely different embodiments of this invention could be made without departing from the scope thereof. Therefore, it is intended that all matter contained in the above description or shown in the accompanying drawings shall be interpreted as illustrative and not in a limiting sense.

What is claimed is:

1. For use in a bombing aircraft which approaches the target in a diving maneuver and releases a bomb during the pull out from the dive, a bombing apparatus comprising a three dimensional cam, the surface of which defines for various flight and atmospheric conditions when, in the pull out path of the aircraft, the bomb should be released to intersect the target, a follower operatively engaging said cam, means for rotatively positioning said cam in accordance with the dive angle at which the aircraft approaches the target, means for translating said cam follower longitudinally with respect to said cam in accordance with flight and prevailing atmospheric conditions, electrical means responsive to the position of said follower for registering the theoretical angle of divergence represented thereby as an electrical quantity, means manually operable to initiate the automatic functioning of the bombing apparatus to signal for the release of a bomb at a point in the pullout path of the aircraft whereby the bomb trajectory will intersect the target, said last named means being operable immediately prior to the aircraft pulling out of the attacking dive, means automatically responsive to flight and atmospheric conditions, electrical means directly actuated by said last named means to provide voltages equivalent to correction factors to the theoretical angle of divergence, means settable in accordance with aircraft and bomb characteristics, electrical means directly actuated by said settable means to provide voltages equivalent to correction factors to the theoretical angle of divergence, and means responsive to a predetermined relationship between the aforementioned electrical voltages for releasing the bomb.

2. For use in a bombing aircraft which approaches the target in a diving maneuver and releases a bomb during the pull out from the dive, a bombing apparatus according to claim 1 and including means responsive to operation of said initiating means for locking the three dimensional cam against further rotative movement.

3. For use in a bombing aircraft which approaches the target in a diving maneuver and releases a bomb during the pull out from the dive, a bombing apparatus according to claim 2 wherein the three dimensional cam is rotated by a servo motor having a control field and the locking means operates as by impressing a direct current voltage on the said control field.

4. For use in a bombing aircraft which approaches the target in a diving maneuver and releases a bomb during the pull out from the dive, a bombing apparatus according to claim 1 wherein the means for rotatively positioning the three dimensional cam includes a feedback potentiometer, the brush of which is positioned in accordance with the rotative position of said cam, a second potentiometer, the brush of which is positioned by a gyroscope in accordance with the target angle of the aircraft, and a circuit extending between said brushes which includes a magnetic amplifier for controlling the energization of the control field of a servo motor directly connected to said cam.

5. For use in a bombing aircraft which approaches the target in a diving maneuver and releases a bomb during the pull out from the dive, a bombing apparatus according to claim 1, wherein the means for translating the cam follower includes a first potentiometer, the brush of which is set to give a voltage in accordance with the static air pressure at the aircraft, a second potentiometer, the brush of which is set to give a voltage in accordance with the static air pressure of the target, means to give a voltage equal to the difference between the aforesaid voltages and representative of the difference in static pressures, a third potentiometer, the brush of which is set to give a voltage in accordance with the impact air pressure at the aircraft, a feed back potentiometer, the brush of which is positioned in accordance with the longitudinal position of the cam follower, a circuit extending from the brush of said feed back potentiometer and including a magnetic amplifier for controlling the energization of the control field of a servo motor which translates said cam follower an amount proportional to the ratio of the difference in the static air pressures to the impact air pressure.

6. For use in a bombing aircraft which approaches the target in a diving maneuver and releases a bomb during the pull out from the dive, a bombing apparatus according to claim 1 wherein the means for rotatively positioning the three dimensional cam includes a feedback potentiometer, the brush of which is positioned in accordance with the rotative position of said cam, a potentiometer, the brush of which is positioned by a gyroscope in accordance with the target angle of the aircraft, and a circuit extending between said brushes which incldudes an amplifier for controlling the energization of the control field of a servo motor directly connected to said cam, and wherein the means for translating the cam follower includes a first potentiometer, the brush of which is set to give a voltage in accordance with the static air pressure at the aircraft, a second potentiometer, the brush of which is set to give a voltage in accordance with the static air pressure of the target, means to give a voltage equal to the difference between the aforesaid voltages and representative of the difference in static pressures, a third potentiometer, the brush of which is set to give a voltage in accordance with the impact air pressure at the aircraft, a second feedback potentiometer, the brush of which is positioned in accordance with the longitudinal position of the cam follower, a circuit extending from the brush of said second feedback potentiometer and including an amplifier for controlling the energization of the control field of a servo motor which translates said cam follower an amount proportional to the ratio of the differences in the static air pressures to the impact air pressure, and further including an additional potentiometer, the brush of which is set to give a voltage representative of the theoretical angle of divergence at which a bomb should be released to intersect the target, said angle being determined by the position of the cam follower on the surface of the cam.

7. For use in a bombing aircraft which approaches the target in a diving maneuver and releases a bomb during the pull out from the dive, a bombing apparatus according to claim 6 including a circuit for producing a voltage proportional to the parallax angle having a first potentiometer, a brush cooperating with said potentiometer, said brush being positioned in accordance with the rotative position of the three dimensional cam, a transformer having a primary and a secondary winding, the primary winding being connected to said brush whereby the voltage impressed thereon depends on the setting of said brush, a second potentiometer, said potentiometer being connected across the secondary winding of said transformer, and a brush cooperating with said second potentiometer and settable thereon in accordance with the computed theoretical divergence angle.

8. For use in a bombing aircraft which approaches the target in a diving maneuver and releases a bomb during the pull out from the dive, a bombing apparatus according to claim 6 including a circuit for producing a voltage proportional to the wind velocity having a potentiometer connected across the terminals of a transformer having a grounded center tap, a brush cooperating with said potentiometer and manually settable in accordance with the wind conditions at the target site.

9. For use in a bombing aircraft which approaches the target in a diving maneuver and releases a bomb during the pull out from the dive, a bombing apparatus according to claim 6 including a circuit for producing a voltage proportional to the angle of attack having a first potentiometer the voltage input to which is determined by the particular type aircraft in which the bombing apparatus is used, a brush cooperating with said potentiometer and manually settable thereon in accordance with the gross weight of the aircraft over the target, a transformer having a primary winding and a secondary winding, the input voltage to the primary winding of which is dependent on the voltage input to the aforesaid potentiometer and the setting of the brush thereon, a second potentiometer, a movable brush cooperating with said potentiometer and connected to the secondary winding of said transformer, said brush being set in accordance with the impact pressure at the aircraft, and a second brush cooperating with said second potentiometer and being movably positioned thereon in accordance with the acceleration of the aircraft.

10. For use in a bombing aircraft which approaches the target in a diving maneuver and releases a bomb during the pull out from the dive, a bombing apparatus according to claim 9 including a circuit for producing a voltage proportional to the zero lift angle of the aircraft which when subtracted from the voltage produced by the angle of attack circuit gives a voltage of the true angle of attack correction, said circuit including a potentiometer and a brush cooperating therewith which is settable in accordance with the zero lift angle of the aircraft.

11. For use in a bombing aircraft which approaches the target in a diving maneuver and releases a bomb during the pull out from the dive, a bombing apparatus according to claim 6 including a circuit for producing a voltage proportional to the bomb drag factor having a first potentiometer, a brush cooperating with said potentiometer and manually settable in accordance with the type of bomb used in conjunction with the bombing apparatus, a second and a third potentiometer each connected to the aforesaid brush, a second brush cooperating with the second potentiometer and settable in accordance with the static pressure at the aircraft, a third brush cooperating with the third potentiometer and manually settable in accordance with the static pressure at the target, a transformer having a first and a second primary winding and a secondary winding, the first primary winding being connected to said second brush and the second primary winding being connected to said third brush, and a fourth potentiometer connected to the aforesaid secondary winding through a brush settable in accordance with the rotative position of the three dimensional cam.

12. For use in a bombing aircraft which approaches the target in a diving maneuver and releases a bomb during the pull out from the dive, a bombing apparatus having a three dimensional cam, a gyroscope controlled circuit for producing a voltage proportional to the difference between the target angle and the gyroscope angle during the pull out from the dive, a circuit for producing a voltage proportional to the theoretical angle of divergence, a circuit for producing a voltage proportional to the angle of parallax, a circuit for producing a voltage proportional to the bomb drag factor, a circuit for producing a voltage proportional to the wind factor, a circuit for producing a voltage proportional to the angle of the attack, means for connecting the aforesaid circuits to form a summation circuit, a bomb release mechanism, means for actuating said bomb release mechanism upon the occurrence of a predetermined relationship between the aforementioned voltages, and wherein the gyroscope controlled circuit includes a gyroscope potentiometer having a brush positioned in accordance with a gyroscope output, a feedback potentiometer having a brush positioned in accordance with the rotative position of said three dimensional cam, a bridge circuit connected to the aforesaid two brushes including a magnetic amplifier for controlling the position of a servo motor, said motor being directly connected to said three dimensional cam, means for locking the servo motor against rotative movement when the pull out from the dive is initiated, thereby locking the position of the brush on said feedback potentiometer, means for disconnecting said magnetic amplifier from said bridge circuit and connecting said bridge circuit to give an output voltage as the bridge is unbalanced as by the brush of the gyroscope potentiometer moving as the attitude of the aircraft changes during the pull out from the dive.

13. For use in a bombing aircraft which approaches the target in a diving maneuver and releases a bomb during the pull out from the dive, a bombing apparatus according to claim 12 wherein said means for disconnecting the magnetic amplifier from the bridge circuit of the gyroscope circuit also functions to connect said amplifier into the summation circuit wherein the amplifier controls the bomb release mechanism actuating means to cause a bomb to be released upon the existence of a pedetermined condition in the summation circuit.

References Cited in the file of this patent

UNITED STATES PATENTS

| | | |
|---|---|---|
| 2,404,736 | Marick | July 23, 1946 |
| 2,488,448 | Townes et al. | Nov. 15, 1949 |
| 2,609,729 | Wilkenson | Sept. 9, 1952 |
| 2,712,269 | Garbarini et al. | July 5, 1955 |
| 2,736,878 | Boyle, Jr. | Feb. 28, 1956 |
| 2,758,511 | McLean et al. | Aug. 14, 1956 |
| 2,805,601 | Morton | Sept. 10, 1957 |